United States Patent [19]
Ohura et al.

[11] Patent Number: 5,712,796
[45] Date of Patent: Jan. 27, 1998

[54] METHOD FOR EVALUATING THE FAULTED SECTIONS AND STATES IN A POWER TRANSMISSION LINE

[75] Inventors: Kazutaka Ohura, Tokyo; Ryouji Matsubara; Masahisa Kaneta, both of Hitachi, all of Japan

[73] Assignee: Hitachi Cable, Ltd., Tokyo, Japan

[21] Appl. No.: 501,573

[22] Filed: Jul. 12, 1995

[30] Foreign Application Priority Data

Jul. 14, 1994 [JP] Japan .................................. 6-162419

[51] Int. Cl.$^6$ .............................. G01R 31/08; H02J 00/00
[52] U.S. Cl. ........................... 364/495; 364/492; 395/21; 395/22
[58] Field of Search ........................ 364/492, 495; 395/21, 23, 22; 324/539; 361/63, 107

[56] References Cited

U.S. PATENT DOCUMENTS 5,566,092  10/1996  Wang et al. ..................... 364/551.02
5,566,273  10/1996  Huang et al. ........................ 395/23

OTHER PUBLICATIONS

Karino Hitoshi, Kaneta Masahisa, Kanemaru Kimiharu; "Improvements of Fault Location for Transmission Lines using Neural Network"; Kenki Gakkai Ronbunshi. B, 1991, vol. 11, No. 11, pp. 1215–1222, Nov. 1991.

Oura Kazutaka, Matsubara Ryoji, Yamaguchi Yuji; "Application of Kohonen's Neural Networks to Fault Location system for Overhead Transmission Lines"; Kenki Gakkai Denryoku, Enerugi Bumon Taikai Ronbunshu, 1994, vol. 5th, No. 2, pp. 581–582, 1994.

Thomas Dalstein, Bernd Kulicke; "Neural Netowrk Approach to Fault Classification for High Speed Protective Relaying" IEEE Transactions on Power Delivery, vol. 10, No. 2, Apr. 1995.

Kimiharu Kanemaru, Hitoshi Kanou, Shigehiro Toyota, masato Nishiura; "Service Experience of AI-Based Fault Location System for Overhead Powers Lines Using OPGW"; Hitachi Cable Review No. 10, pp. 13-18, Aug. 1991.

*Primary Examiner*—James P. Trammell
*Assistant Examiner*—Demetra R. Smith
*Attorney, Agent, or Firm*—Rogers & Killeen

[57] ABSTRACT

The faulted sections are evaluated by calculating the measuring information resulted from the faults in various positions by the previous fault simulative calculation, introducing the resulting fault simulative measuring information into a self-organizing neural network having output elements of which number being more than that of input elements to permit the self-organizing neural network to learn the classification of the simulative measuring information, preparing an evaluation rule representing the correspondent relation between the output from the classification of the stimulative measuring information and the faulted position, thereafter introducing actual measured information into the self-organizing neural network to permit the self-organizing neural network to classify the introduced actual measured information, and evaluating the faulted section from an output classified by the self-organized neural network on the basis of the evaluation rule.

4 Claims, 5 Drawing Sheets

METHOD FOR EVALUATING THE FAULTED SECTIONS AND STATES IN A POWER TRANSMISSION LINE

FIELD OF THE INVENTION

The present invention relates to a method for evaluating the faulted sections and states in a power transmission line from the current flowing through an aerial ground wire, and more particularly to, a method for evaluating the faulted sections and states in the power transmission line by which the faulted section can be evaluated by limiting the faulted section to a range narrower than the interval of current measurement.

BACKGROUND OF THE INVENTION

As one of conventional methods for evaluating the faulted section in the power transmission line, the method comprising the steps of measuring the current flowing through an aerial earth wire upon the fault of the power transmission line by a plurality of sensors disposed along the line, and introducing the measured information into a back propagation neural network to obtain an output evaluating the faulted section is known in the art. According to the method, the faulted section can be evaluated in the sectional unit divided by the interval between the sensors disposed along the power transmission line. More in detail, this method comprises the steps of previously varying the fault positions in a power transmission line to calculate the output of the sensors based on the fault simulative computation, permitting the neural network to learn the relationship between the resulting sensor computed output and the section of the sensors identifying signal corresponding to a fault position of the power transmission line, receiving an output from the sensors in an actual faulted time to evaluate the position in the sensor sectional units by the neural network. As the reference related to this art, for example, the article entitled "Development of Transmission Line Fault Section Evaluating System Using Neural Networks" has been disclosed in a national meeting of the Electrical Society, 1993, No. 1357.

In order to improve the capabilities and functions in evaluation of the faulted section in the power transmission line, it has been required to improve the resolving power of the evaluation and to enable it to specify the faulted state. Actually, such a requirement may be achieved by selecting an appropriate processing because the output of a sensor is depended on the faulted position even the fault within the same section.

However, in such a conventional mode, in order to evaluate the faulted section narrower than the interval of sensors set in the power transmission line, it is required to narrow the section corresponding to the output of the neural network. In this case, if the section where the power transmission line has no sensor is divided, the evaluation of the fault generated near such a divided section may have a high probability of error.

Further, it is first required to give how to divide the section as a teaching signal, and in order to determine an optimum way to give, it is required to compare such various ways, resulting in the need of very extensive calculated amounts.

Accordingly, it is an object of this invention to solve the above problems and to provide a method for evaluating the faulted sections and states in a power transmission line which is capable of limiting the faulted section to a range narrower than the interval of current measurement as well as evaluating the faulted state in the power transmission line.

SUMMARY OF THE INVENTION

The present invention provides a method for evaluating a faulted section in a power transmission line by measuring the current flowing through an aerial earth wire at a plurality of places along the power transmission line to evaluate the fault section from the measured information, comprising the steps of calculating the measuring information resulted from the faults in various positions by the previous fault simulative calculation; introducing the resulting fault simulative measuring information into a self-organizing neural network having output elements of which number being more than that of input elements to permit the self-organizing neural network to learn the classification of the simulative measuring information; preparing an evaluation rule representing the correspondent relation between the output from the classification of the simulative measuring information and the faulted position; thereafter introducing actual measured information into the self-organized neural network to permit the self-organizing neural network to classify the introduced actual measured information; and evaluating the faulted section from an output classified by the self-organizing neural network on the basis of the evaluation rule.

Further, the present invention provides a method for evaluating the faulted section and state in a power transmission line by measuring the current flowing through an aerial earth wire at a plurality of places along the power transmission line to evaluate the faulted section and state from the measured information, comprising the steps of calculating the measuring information resulted from the faults in various positions by the previous fault simulative calculation; introducing the resulting fault simulative measuring information into a self-organizing neural network having output elements of which number being more than that of input elements to permit the self-organizing neural network to learn the classification of the simulative measuring information; preparing an evaluation rule representing the correspondent relation among the output from the classification of the simulative measuring information, the faulted position and the faulted state; thereafter introducing actual measured information into the self-organized neural network to permit the self-organizing neural network to classify the introduced actual measured information; and evaluating the faulted section and faulted state from an output classified by the self-organizing neural network on the basis of the evaluation rule.

Alternatively, the faulted sections can be evaluated by the steps of preparing the above evaluation rule for every evaluated state, identifying the faulted state from the waveform information measured in a transformation station, and evaluating the faulted states on the basis of the evaluation rule for the faulted states.

Furthermore, the faulted sections and states can be evaluated by the steps of preparing the above evaluation rule on the line-to-ground fault (earth-ground fault) and steel tower-ground fault, and when it turned out to be the single line-to-ground fault from the waveform information measured in a transformation station, and evaluating the faulted sections and states on the basis of this evaluation rule.

The self-organizing neural network has a function to classify a number of inputs into several groups each consisting of similar inputs without using teaching signals. In the present invention, the division of the evaluating section is not conducted by a person, but it is appropriately effected by the self-organizing neural network by limiting the fault section to the range narrower than the interval of sensors.

That is, the fault simulative calculation is effected by varying the fault positions in advance to obtain the simulative measuring informations which must be resulted from the faults in various positions of a power transmission line. These simulative measuring informations are introduced into the self-organizing neural network to permit it to learn the classification of the simulative measuring informations. The self-organizing neural network will classify the measuring informations by permitting the similar neurons to respond to the similar simulative measuring informations. This self-organizing neural network has the number of output elements more than that of input elements, so that the number of classified informations is larger than that of measuring points or places (the places for simulative calculation). The evaluation rule can be prepared by permitting the classified output results of the simulative measuring information from the self-organizing neural network to correspond to the fault positions given to the fault simulative calculation. Since the number of classified informations is larger than that of measuring points, the fault positions in the evaluation rule can be represented by the section in the range narrower than the section based on the interval of measuring points. Once the evaluation rule is prepared, an actual measured information is introduced into the self-organizing neural network. Based on the evaluation rule, the faulted section in the power transmission line is evaluated from the output classified by the self-organizing neural network, and thus the faulted section can be evaluated by limiting it to the range narrower than the interval of current measurement.

In addition to the variation of the fault positions, if the fault simulative calculation is conducted by varying the fault states in the fault section, and this simulative measured information is introduced into the self-organizing neural network, its resulting classified output will include the relation corresponding to the fault states. Furthermore, the learning effect of the self-organizing neural network can be improved by giving the measuring information having an error added thereto. The evaluation rule can be prepared by permitting the classified output results of the simulative measuring information from this self-organizing neural network and the error added to the simulative measuring information to correspond to the fault position and state given to the fault simulative calculation. Then, an actual measured information is introduced into the self-organizing neural network. Based on the evaluation rule, the faulted section in the power transmission line evaluated from the output classified by the self-organizing neural network, and thus the faulted section can be evaluated by limiting it to the range narrower than the interval of current measurement. When the waveform information such as voltage or current waveform of transmission line or current waveform of an aerial ground wire and the like can be measured in a substation, the faulted state can be identified to some degree from this waveform information. Therefore, the evaluation rule is previously prepared by permitting the self-organizing neural network to learn the fault state for each identifiable fault state. Based on this evaluation rule, when the fault section in the power transmission line is evaluated, a high accuracy of evaluation can be obtained.

In the single line-to-ground fault, it is very impossible to distinguish the steel tower-ground fault from the earth-ground fault even using the information of the transformation station. Accordingly, by preparing an evaluation rule for both simulative the earth-ground fault and steel tower-ground fault, the fault section and state can be evaluated on the basis of this evaluation rule when it is confirmed as the single line-to-ground fault.

These and other objects, features, and advantages of the present invention may be more clearly understood and appreciated from a review of the following detailed description of the disclosed embodiments and by reference to the appended drawings and claims.

BRIEF DESCRIPTION OF THE DRAWINGS

FIG. 1 is a schematic view of a system to embody a method of the present invention;

FIG. 2 is a schematic view of the structure of a self-organizing neural network utilized in the present invention;

DETAILED DESCRIPTION OF THE PREFERRED EMBODIMENT

Figure 4A:
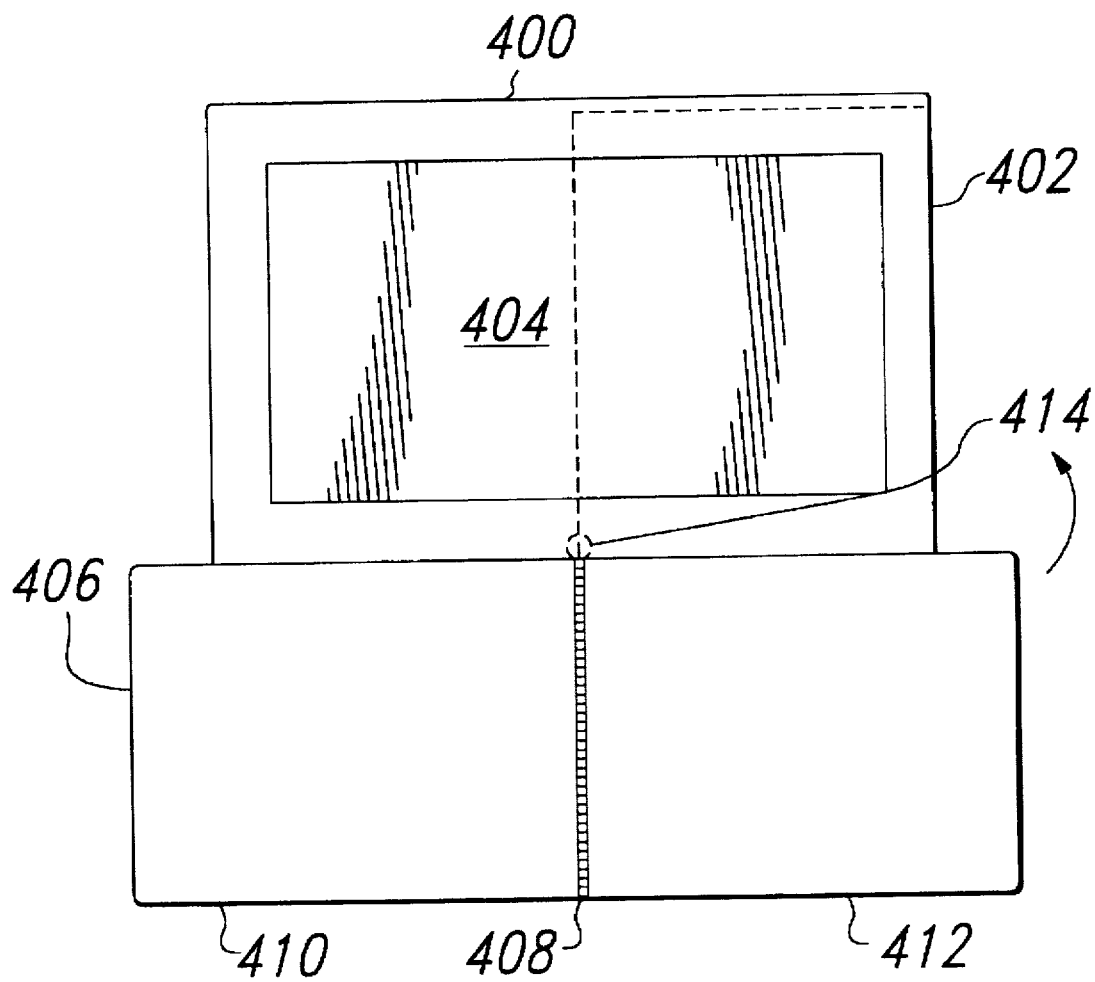
FIG. 4 are distribution curves showing the current and phase distributions in an aerial earth line upon the fault of a power transmission line.
Figure 4B:
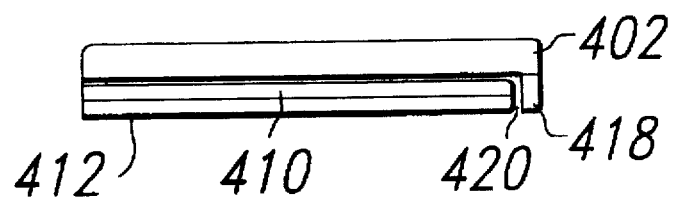

Referring now to the drawings, a preferred embodiment of the present invention is described below.

As shown in FIG. 1, a system to evaluate the faulted section and its state or phase in a power transmission line comprises a plurality of current sensors 1 and transmission devices 2 to transmit the data from the current sensors 1 which are disposed along an aerial ground wire of the power transmission line, an optical fiber 3 to transmit the information of the transmission devices 2, and a central data processing unit 4 to collect the information from the current sensors 1 for evaluating the faulted position and its state in the power transmission line. In the present invention, the central data processing unit 4 has a self-organizing neural network, the measured information collected from the current sensors 1 is introduced into the self-organizing neural network to classify the information, and the faulted section and its state can be evaluated from the output classified by the self-organizing neural network on the basis of the evaluation rule. The procedures of the data processing in the central data processing unit 4 are explained below.

Procedure 1

With respect to the fault position and state expectable from the previous fault simulative calculation, the current flowing through an aerial earth wire in each of sensor set up places is calculated.

Procedure 2

The simulative measuring information based upon each sensor current determined in the procedure 1 is introduced into a self-organizing neural network to permit it to learn the classification of the information. By this learning, the self-organizing neural network may classify the similar simulative measuring informations into the same group.

Procedure 3

To the each sensor current determined in the procedure 1 is added an error (referred to as overlapped error upon preparing an evaluation rule) to prepare a specified number of an error overlapped simulative measuring information. This error overlapped simulative measuring information is classified into groups by the self-organizing neural network taught in the procedure 2, and the relations among the classified groups, the fault position and state are determined. This correspondent relationship is regarded as the evaluation rule.

Procedure 4

The measured informations based on an actually measured sensor currents are classified into any group by self-organizing neural network taught in procedure 2. The faulted section and state are evaluated whether they are corresponded to any classified group based on the evaluation rule. At this time, the first cadidature, the secon candidature, ... may be provided depending to an extent of resemblance in the self-organizing neural network.

Next, the structure of the self-organizing neural network and how to learn using it will be explained hereinafter. As shown in FIG. 2, the self-organizing neural network comprises two-dimensionally disposed neurons 21 and input units 22 connected to all of the neurons 21. The input units 22 are input elements of the self-organizing neural network, and their numbers are n. The input units 22 are arranged in the disposed order of the current sensors 1, and can received the inputs $a_j(t); a_1(t), a_2(t), \ldots a_n(t)$ obtained by standardizing the outputs of a series of n sensors as a measuring information. The neurons 21 are output elements, and as shown in FIG. 2, they can be represented by a formula $N_{xy}$ having a variable x in the direction of X axis and a variable y in the direction of Y axis, and the magnitude of its outputs 23 is Oxy(t). The number of the neurons 21 is larger than that of the input units 22. The connection of respective neurons 21 with respective input units 22 can be weighted by the weight $W_{xyj}$.

Therefore, the relation between the input and the output can be represented by the formula:

$$O_{xy}(t) = \sum_{j=1}^{n} a_j(t) \cdot W_{xyj}$$

where $$\sum_{j=1}^{n} a_j(t)^2 = 1$$

$$\sum_{j=1}^{n} W_{xyj}^2 = 1$$

The maximum values of x, and y is set previously.

The procedures of the learning are as follows:

Procedure 1

The measuring informations to be classified, for example, they are classified for each of the simulative measuring informations used for the learning. The measuring informations are obtained from one group of sensor outputs at the same measuring timing, and are represented symbols A, B, ' ' '.

For example, the measuring information A is as follows:

$A = \{a_1, a_2, a_3, ' ' ', a_n\}$;

and by the normalization it comes to as follows:

$|A| = 1$

Procedure 2

An initial value is randomly given to each weight $W_{xyj}(\tau)$ at the learning step, $\tau = 0$.

Procedure 3

The learning step $\tau$ is updated at $\tau = \tau + 1$.

Procedure 4

An error value is added to the measuring information A to obtain the neuron $N_{xy}$ having the maximum output weight $O_{xy}(\tau)$. The error value is permitted to be large when the learning step $\tau$ is small and is decreased with increase of $\tau$. In this preferred embodiment, the error value is linearly decreased from the initial value in such a way that it comes to "0" at $\tau_{MAX}$. This initial value is termed "initial error".

Procedure 5

The weights of neuron $N_{xy}$ and its peripheral neurons are updated according to the following equation:

$$W_{xyj}(\tau+1) = W_{xyj}(\tau+1) + \alpha(\tau) \, (a_j(\tau) - W_{xyj}(\tau))$$

where $\alpha(\tau)$ depicts a rate of learning, is a function decreasing with time (learning step $\tau$), and is $0 < \alpha(\tau) < 1$. In this preferred embodiment, the error value is linearly decreased from the initial value in such a way that it comes to "0" at $\tau_{MAX}$.

The peripheral size to specify the neurons lain in the vicinity of the neuron $N_{xy}$ is permitted to be large when the learning step $\tau$ is small and it is gradually decreased with increase of $\tau$. In this preferred embodiment, the peripheral size is linearly decreased from the initial value in such a way that it comes to "0" at $\tau_{MAX}$. This initial value is termed "initial value of peripheral size".

Procedure 6

The weights $[W_{xy1}, W_{xy2}, ' ' ', W_{xyn}]$ are normalized.

Procedure 7

With respect to the measuring information after measuring the information B, the procedures following by procedure 4 are repeated.

Procedure 8

If the learning step $\tau$ is $\tau < \tau_{MAX}$ it is returned to procedure 3. That is $\tau$ the learning step is updated, and if the learning step is $\tau = \tau_{MAX}$, it is finished, where $\tau_{MAX}$ depicts the number of the predetermined learning steps.

After finishing the learning through these procedures, the position (x, y) of the neuron having the maximum output for a specified input is classified. The similar inputs are classified into a group having much the same neuron position. Alternatively, a series of outputs can be classified into the first, second, third, ' ' ', nth candidates depending on the magnitude of the outputs.

Next, a preferred embodiment of the present invention applied to a power transmission line system shown in FIG. 3 will be described.

Figure 3:
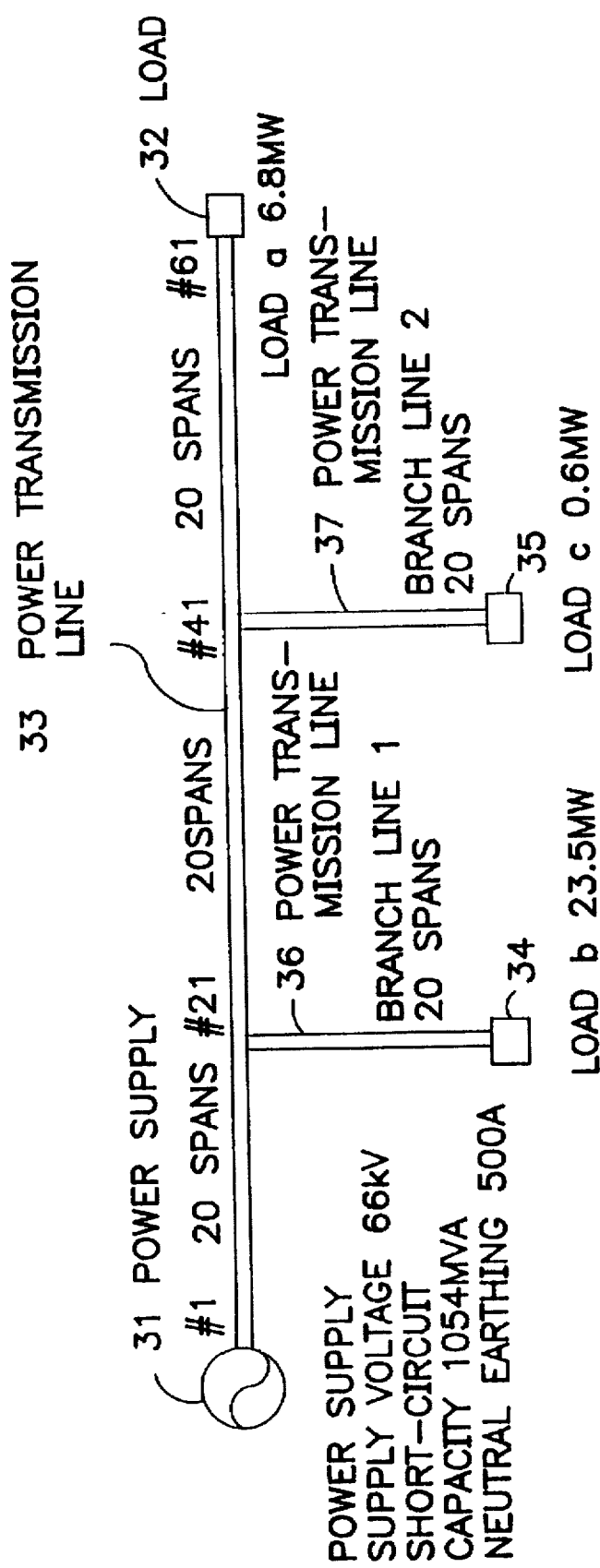
FIG. 3 is a schematic view of a power transmission line applied to the method of the present invention.
Figure 4:
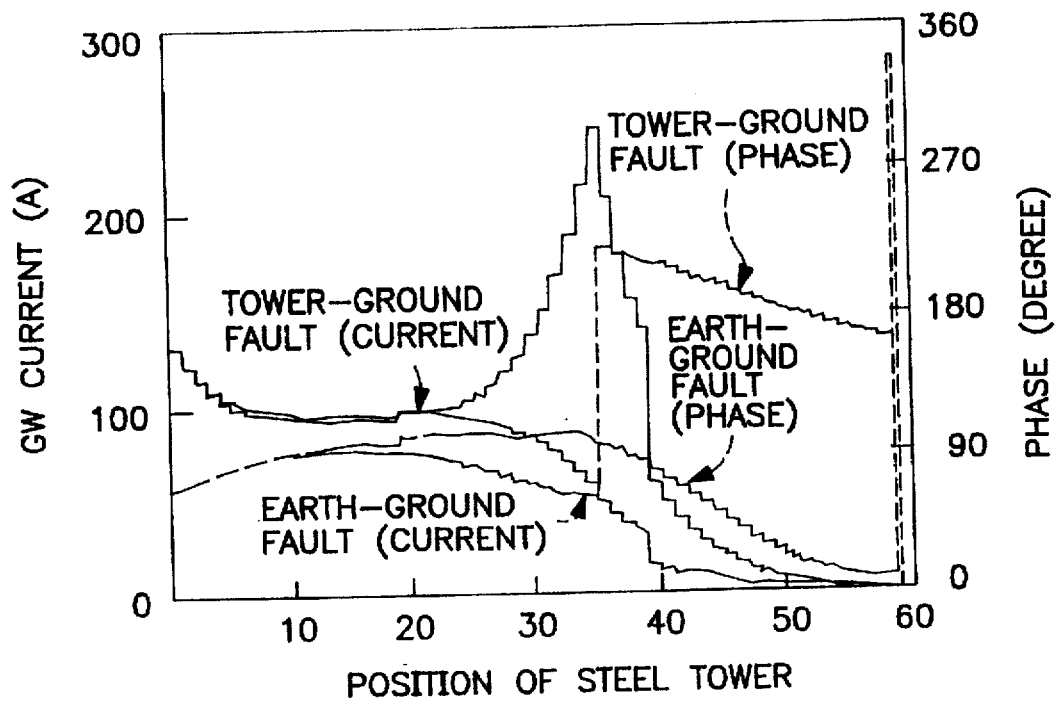
Figure 5:
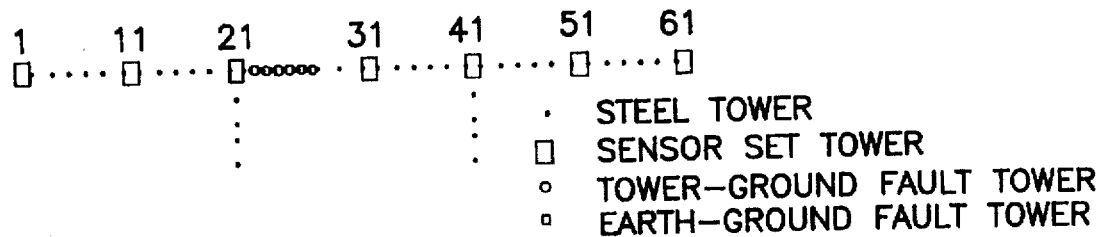
FIG. 5 is a schematic view showing the faulted positions and states of classified group 1.
Figure 6:
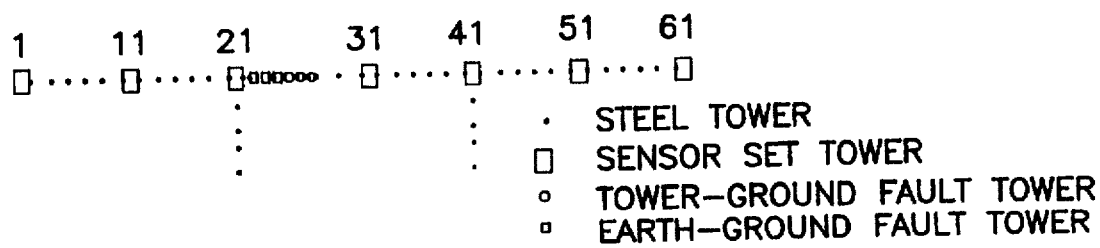
FIG. 6 is a schematic view showing the faulted positions and states of classified group 2.

As shown in FIG. 3, this system comprises a power transmission line 33 having 60 spans and extended from a power supply 31 to a load 33, and two branched power transmission lines 36 and 37. The line 36 is branched off the point having 20 spans from the the power supply 31 and has 20 spans to a load 34, and the line 37 is also branched off the point having 40 spans from the the power supply 31 and has 20 spans to a load 35. FIG. 4 shows the current and phase distributions of an aerial earth wire when the steel tower-ground fault and the earth-ground fault occurred in the above system, As shown, in FIG. 4, the current flowing the aerial earth wire is remarkably changed in the faulted position, and conversely, the place where the current is remarkably changed is dependent on the faulted position. The faulted positions and states in the power transmission line can be evaluated by disposing a series of current sensors at appropriate intervals and analyzing the distribution pattern of measured current. In this preferred embodiment, the current sensors are disposed onto steel towers #1, #11, #31, ' ' ', and #61 with an interval of 10 spans, respectively. Then, the simulative fault calculations, that is, the calculated results of the current to be measured in each of the current sensor disposed on the steel towers when the faults occurs in various positions in the above system are introduced into a self-organizing neural network for learning them thereby, and an error value is added to the the simulative measured results to classify the resultants. A part of the classified results is shown in FIGS. 5 and 6. FIG. 5 shows the fault positions and states classified into a certain neuron position. The fault state shown in FIG. 5 is only steel tower-ground fault. FIG. 6 shows the fault positions and states classified into another neuron position. In this case, the fault states are classified into both the steel tower-ground fault and the earth-ground fault. As shown in these drawings, the fault positions classified into a certain neuron position are gathered in a particular place, and their intervals are almost narrower than the interval of the sensors. The fault consists of one or plural type of states. If actual measured information is classified as the fault of steel tower numbers 22-27 shown in FIG. 5, the fault state will be evaluated to be the steel tower-ground fault. If actual measured information is classified as the fault of steel tower numbers 22-27 shown in FIG. 6, the fault state will be evaluated to be unclear.

Figure 7:
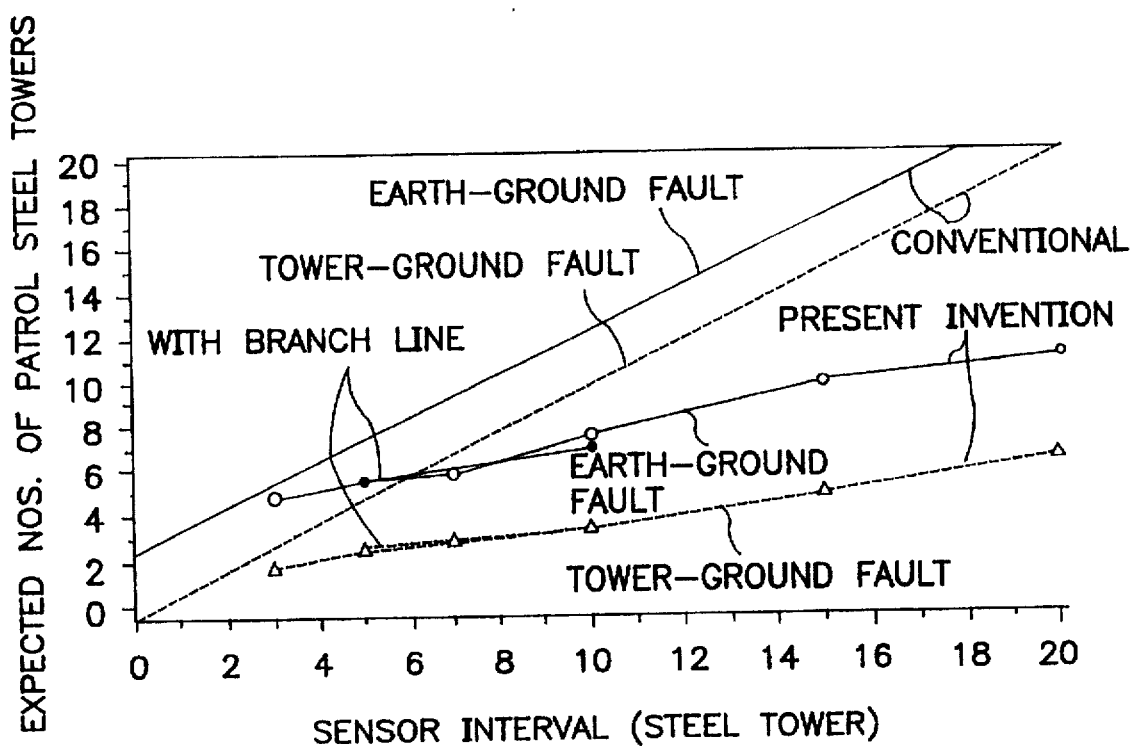
FIG. 7 is a diagram showing the relation between the expected value for the number of steel towers to be patrolled and the intervals of sensors.

The number or value expected for the steel tower to be patrolled can be determined based on the evaluated results. FIG. 7 shows the relationship between the expected number of steel towers to be patrolled and the intervals of sensors by comparison of the present invention and a conventional method. As shown in FIG. 7, the expected value of patrol steel towers in the present invention tends not to increase remarkably even if the interval of the sensors is increased, compared with a remarkable increase of the expected value in the conventional method. Therefore, in a case where the same number of sensors are set along an aerial earth wire in both the present invention and the conventional method, the patrol steel towers in the present invention will have fewer number, for example, half or less the number in the steel tower-ground fault, compared with that of the conventional method.

Figure 8:
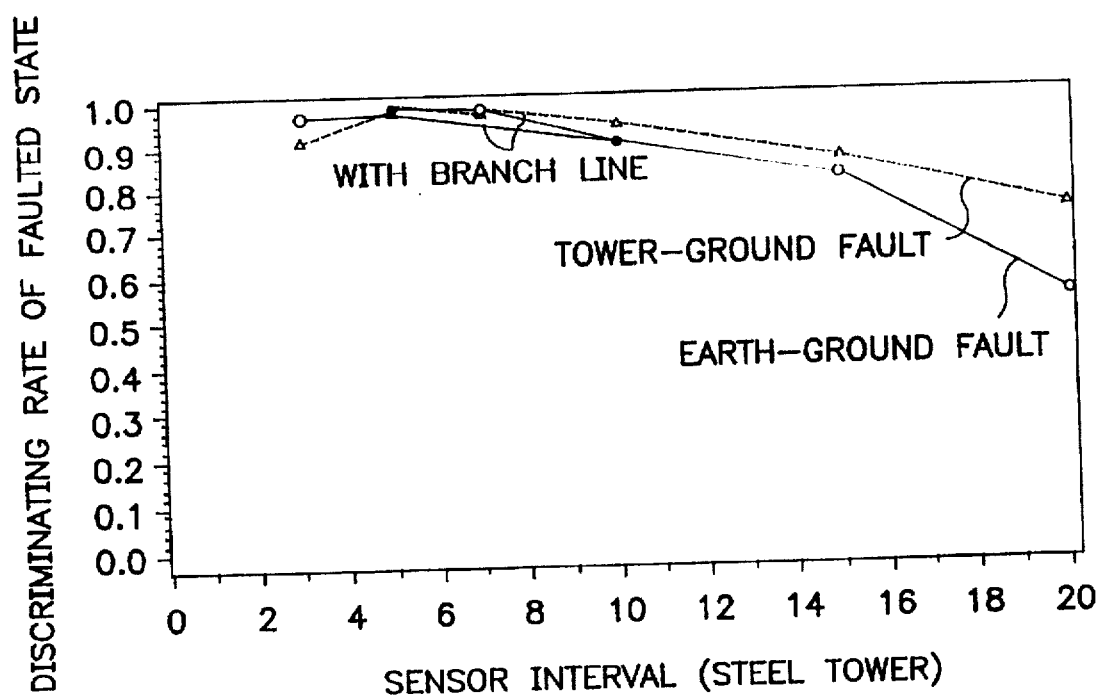
FIG. 8 is a diagram showing the relation between the discrimination rate of the fault states and the intervals of sensors.

FIG. 8 shows the relation between the discriminating rate of faulted states and the intervals of sensors. It is understandable that a high rate of discriminating the faulted states can be achieved by providing the sensors having an interval less than a certain level.

Next, other preferred embodiments of the present invention will be described.

In addition to the information measuring the aerial earth wire, the information for the voltage of a power transmission line and its peripheral electric and magnetic informations may be used for the evaluation of such faulted sections and states.

Further, in the case where the waveform information provided by an oscilloscope and the like in a substation may be used, the faulted states can be discriminated to a certain extent by analyzing the waveform and the like. The evaluation rule may previously be prepared by permitting a self-organizing neural network to learn the faulted states for every discriminatable faulted state. A high accuracy of evaluation can be obtained by evaluating the faulted sections based on this evaluation rule.

In the case of single line-to-ground fault, it is very difficult to discriminate the steel tower-ground fault flashing between arching horns from the earth-ground fault flashing between a power line and the earth through a crane and the like even using the information of the substation.

On the other hand, according to the present invention, in the case where the evaluation rule is prepared by simulating the steel power-ground fault and earth-ground fault, and the waveform information measured in the substation is examined and the ground fault is evaluated to be the single line-to-ground fault, the faulted sections and states can be evaluated whether the faulted state is the steel power-ground fault or the earth-ground fault on the basis of this evaluation rule.

The present invention has the effects such as (1) it can evaluate the fault section by limiting it to the range narrower than the interval for measuring the current (sensor interval), and thus the region to patrol the power transmission lines upon an accident is narrowed, and its labors and times can be saved; and (2) it can evaluate the faulted state as well as the faulted section, and hence it is easy to get ready for turning out upon the patrol of the power transmission lines.

The preferred embodiment of the present invention has been disclosed by way of example and it will be understood that other modifications may occur to those skilled in the art without departing from the scope and the spirit of the appended claims.

What is claimed is:

1. A method for evaluating a faulted section in power transmission line by measuring the current flowing through an aerial earth wire at a plurality of places along the power transmission line to evaluate the fault section from the measured information, comprising the steps of calculating the measuring information resulted from the faults in various positions by the previous fault simulative calculation; introducing the resulting fault simulative measuring information into a self-organizing neural network having output elements of which number being more than that of input elements to permit the self-organizing neural network to learn the classification of the simulative measuring information; preparing an evaluation rule representing the correspondent relation between the output from the classification of the simulative measuring information and the faulted position; thereafter introducing actual measured information into the self-organized neural network to permit the self-organizing neural network to classify the introduced actual measured information and evaluating the faulted section from an output classified by the self-organizing neural network on the basis of the evaluation rule.

2. A method for evaluating the faulted section and state in a power transmission line by measuring the current flowing through an aerial earth wire at a plurality of places along the power transmission line to evaluate the faulted section and state from the measured information, comprising the steps of calculating the measuring information resulted from the faults in various positions by the previous fault simulative calculation; introducing the resulting fault simulative measuring information into a self-organizing neural network having output elements of which number being more than that of input elements to to permit the self-organizing neural network to learn the classification of the simulative measuring information; preparing an evaluation rule representing the correspondent relation among the output from the classification of the simulative measuring information, the faulted position and the faulted state; thereafter introducing actual measured information into the self-organizing neural network to permit the self-organizing neural network to classify the introduced actual measured information; and evaluating the faulted section and faulted state from an output classified by the self-organized neural network on the basis of the evaluation rule.

3. The method for evaluating a faulted section in a power transmission line, according to claim 1 wherein said evaluation rule is prepared for every fault state, the fault state is discriminated from the waveform information measured in a transformation station, and the faulted section is evaluated on the basis of said faulted state evaluation rule.

4. The method for evaluating the faulted section and state in a power transmission line, according to claim 2 wherein said evaluation rule is prepared as to the earth-ground fault and steel tower-ground fault, and when the ground fault is determined to be a single line-to-ground fault from the waveform information measured in a transformation station, and the faulted section and state are evaluated on the basis of said evaluation rule.

* * * * *